United States Patent [19]

Reneau et al.

[11] 4,256,283
[45] Mar. 17, 1981

[54] PIVOTAL BALL CHECK VALVE

[76] Inventors: Bobby J. Reneau, 15527 Morales, Houston, Tex. 77039; Luther L. Manchester, Jr., 810 Woodstock, Bellaire, Tex. 77401

[21] Appl. No.: 27,945

[22] Filed: Apr. 6, 1979

[51] Int. Cl.³ .................. F16K 25/00; F16K 3/314
[52] U.S. Cl. .......................................... 251/62; 251/87
[58] Field of Search .................... 251/62, 58, 87; 137/516.25, 516.27

[56] References Cited

U.S. PATENT DOCUMENTS

| Re. 27,789 | 10/1973 | Tillman . |
| 382,655 | 5/1888 | Montgomery . |
| 398,111 | 2/1889 | Abbot et al. . |
| 584,291 | 6/1897 | Osgood . |
| 1,113,282 | 10/1914 | Anderson . |
| 1,530,827 | 3/1925 | Gunn et al. . |
| 1,832,341 | 11/1931 | Williamson . |
| 1,885,000 | 10/1932 | Müller . |
| 2,354,255 | 7/1944 | Gillum et al. . |
| 2,629,578 | 2/1953 | Paul, Jr. . |
| 2,735,047 | 2/1956 | Garner et al. . |
| 2,756,017 | 7/1956 | Silverman . |
| 2,791,279 | 5/1957 | Clark, Jr. . |
| 2,829,719 | 4/1958 | Clark, Jr. . |
| 2,912,012 | 11/1959 | Klingler . |
| 2,948,503 | 8/1960 | Williams . |
| 2,989,283 | 6/1961 | Klingler . |
| 3,132,666 | 5/1964 | Nelson ............................ 137/516.25 |
| 3,166,094 | 1/1965 | Eagleton . |
| 3,337,178 | 8/1967 | Gordon . |
| 3,455,534 | 7/1969 | Scaramucci . |
| 3,557,822 | 1/1971 | Chronister . |
| 3,610,574 | 10/1971 | Hartman . |
| 3,624,802 | 11/1971 | Ripert . |
| 3,749,355 | 7/1973 | Paul, Jr. ......................... 137/DIG. 2 |
| 3,837,617 | 9/1974 | Eminger et al. . |
| 3,900,230 | 8/1975 | Durling . |
| 3,926,408 | 12/1975 | Vogeli . |
| 3,949,786 | 4/1976 | Houston . |
| 3,991,784 | 11/1976 | Gano ................................. 137/458 |

FOREIGN PATENT DOCUMENTS

| 621226 | 11/1935 | Fed. Rep. of Germany . |
| 634641 | 9/1936 | Fed. Rep. of Germany . |
| 709220 | 8/1941 | Fed. Rep. of Germany . |
| 2817970 | 2/1978 | Fed. Rep. of Germany ............. 251/62 |
| 578668 | 6/1958 | Italy . |

Primary Examiner—Arnold Rosenthal
Attorney, Agent, or Firm—Pravel, Gambrell, Hewitt, Kirk, Kimball & Dodge

[57] ABSTRACT

A ball valve housing including a main housing section and an actuator housing section wherein a ball valve is mounted in the actuator housing section for movement into the main housing section, the ball valve being pivotally connected to an actuator shaft for axial and rotational movement to a seated position against one of two opposing annular seating surfaces in the main housing section.

9 Claims, 4 Drawing Figures

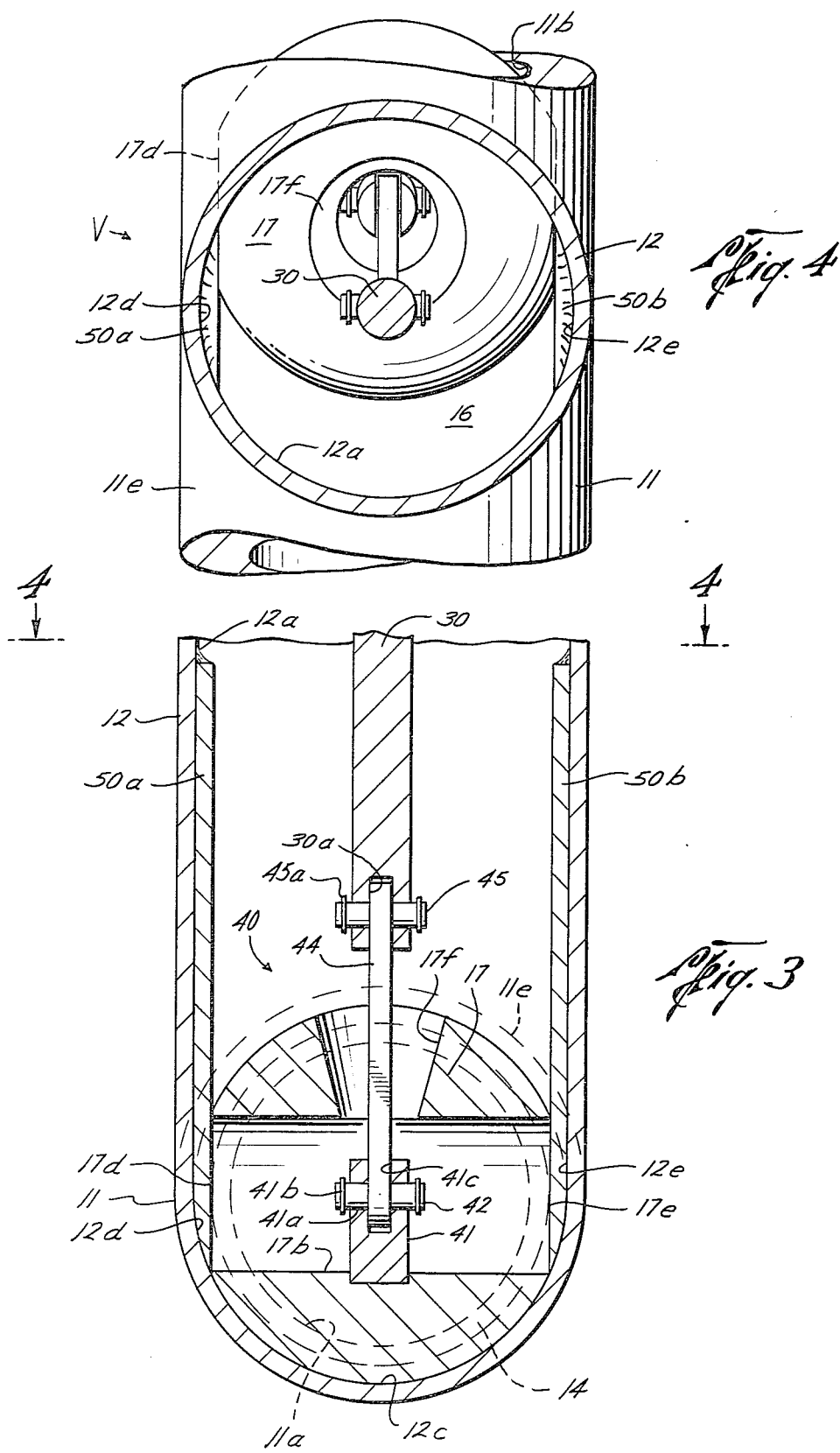

PIVOTAL BALL CHECK VALVE

TECHNICAL FIELD

The field of this invention relates to ball valves, and in particular to pivotal ball check valves.

PRIOR ART

The prior art is replete with valves having valve elements mounted for movement into and out of a main passageway. U.S. Pat. No. 3,837,617 discloses a gate valve having a valve disc pivotally mounted by a doubly pinned link to a valve stem which moves the valve disc into and out of a main passageway. The disc is pivotally mounted with respect to the valve stem for translational movement into engagement with two sets of valve seats positioned on either side of the valve disc as positioned in the main fluid passageway. The valve disc includes slots which engage opposing guides to prevent flutter or chatter of the disc as a result of fluid flowing through the valve. Another pivotally mounted gate valve is disclosed in U.S. Pat. No. 3,926,408. U.S. Pat. No. 3,991,784 discloses a high-low reciprocating ball type valve which is mounted for pivotal movement against a single seat positioned at the end of an inclined surface in the main passageway, which inclined surface is taught as positively urging the ball into a sealing position. The ball valve in U.S. Pat. No. 3,991,784 is mounted for pivotal, translatory movement axially within the main passageway. U.S. Pat. No. 1,832,341 discloses a ball valve mounted similarly to that disclosed in U.S. Pat. No. 3,991,784; however, in this patent, the seating surface is in a plane perpendicular to the initial directional movement of the ball valves as it is moved to a seated position by a hydraulic actuator. U.S Pat. Nos. 2,989,283 and 2,912,012 disclose ball valves which are mounted for pivotal movement by means of a lever which extends out of the ball valve housing. And, U.S. Pat. No. 1,113,282 discloses an emergency check valve mounted for pivotal movement about a shaft which swings the valve between two valve seats.

Additional patents showing various types of valves which are movable into and out of a main passageway include Re. 27,789; 3,624,802; 3,610,574; 3,557,822; 3,337,178; 2,948,503; 2,735,047; 1,885,000; 584,291; Italian Pat. No. 578,668; German Pat. No. 709,220; German Pat. No. 634,641; and German Pat. No. 621,226.

Additional, less pertinent patents including valves having floating ball valve elements responsive to fluid flow within a main passageway include U.S. Pat. Nos. 3,949,786; 3,900,230; 3,455,534; 3,166,094; 3,132,666; 2,829,719; 2,791,279; 2,756,017; 2,629,578; 2,354,255; 1,530,827; 398,111; and 382,655.

SUMMARY OF THE INVENTION

This invention relates to a new and improved pivotal ball check valve mountable in an actuator housing section bore for movement into a sealed position into a main housing section bore in order to block flow therethrough. The pivotal ball check valve is seatable against one of two opposing annular seating surfaces and actually moves into seating engagement with one of the annular seating surfaces by a combination of both axial and rotational movement, the rotational movement being limited by the mechanical connection of the ball valve element to a connecting link arm which connects the ball valve element to an actuator shaft. This feature and other features of this invention will be described in more detail in the following description and the claims presented after the detailed description represent the scope of the subject matter considered patentable.

BRIEF DESCRIPTION OF THE DRAWINGS

FIG. 3 is a sectional view taken along line 3—3 of FIG. 2; and

FIG. 4 is a top view partly in section taken along line 4—4 of FIG. 3.

DESCRIPTION OF THE PREFERRED EMBODIMENT

Figure 1:
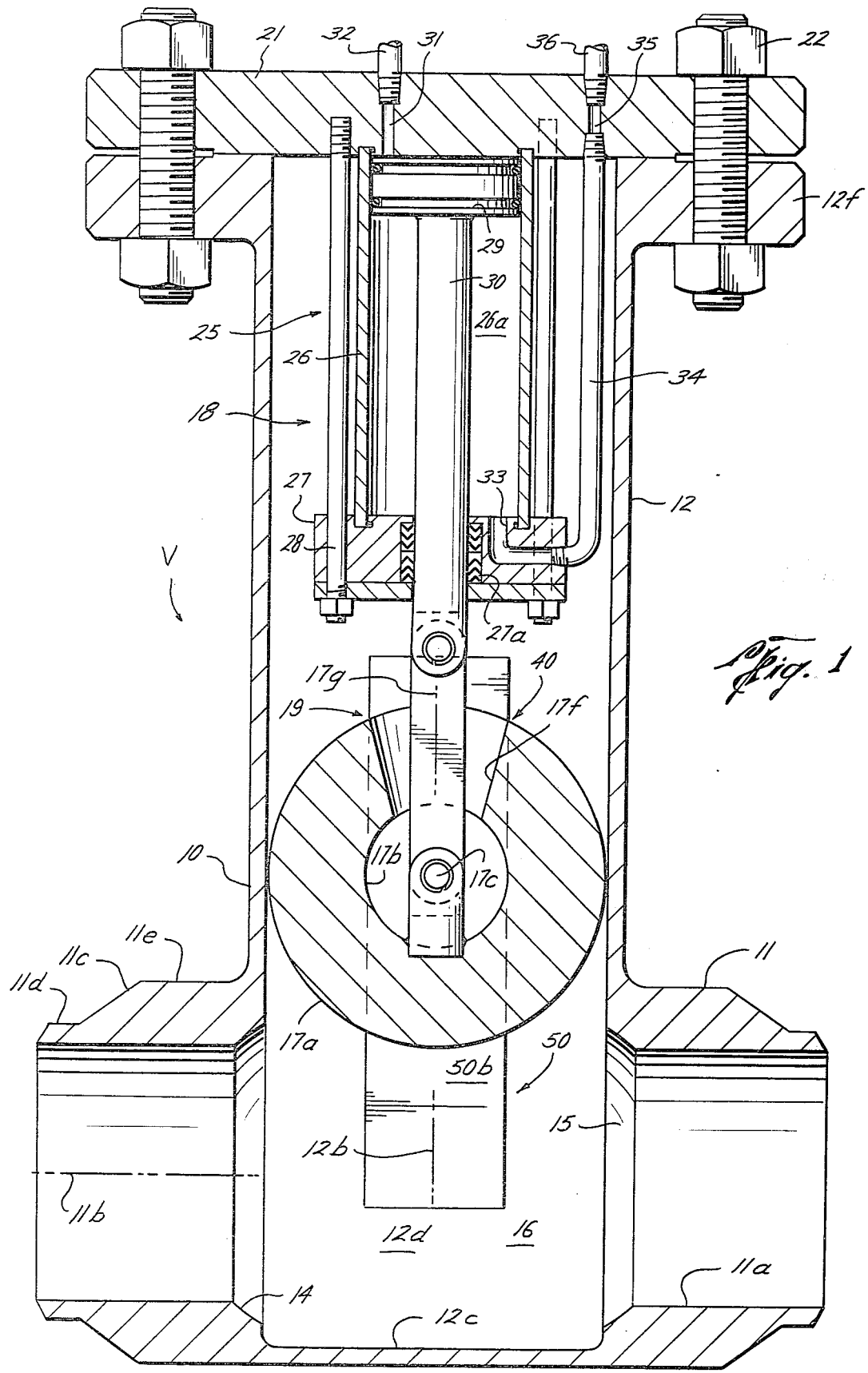
FIG. 1 is a sectional view of the pivotal ball check valve of the preferred embodiment of this invention wherein the pivotal ball check valve is in a withdrawn position.

Referring to the drawings, the letter V generally designates the pivotal ball check valve of the preferred embodiment of this invention. The pivotal ball check valve V includes a T-shaped housing generally designated by the number 10. The T-shaped housing 10 includes a main housing section 11 having a main bore 11a and an actuator housing section 12 having actuator bore 12a. The main bore 11a is defined as having central axis 11b and the actuator bore 12a is defined as having central axis 12b.

First and second annular seating surfaces 14 and 15 are formed across axis 11b of the main housing section bore 11a on opposite sides of the cube-like area 16 which is common to both the main bore 11a and the actuator bore 12a.

A ball valve element 17 having a substantially spherical configuration is mounted for movement within the actuator housing bore 12a and in the area 16 common to the actuator bore 12a and main housing bore 11a for sealably engaging one or the other of annular seating surfaces 14 and 15.

Actuator means generally designated by the number 18 is mounted with the actuator housing section 12 and in operative connection with the ball valve element 17 for moving the ball valve element between a first position (FIG. 1) wherein the ball valve element 17 is positioned in the actuator housing section bore 12a and a second, sealing position (FIG. 2) in which the ball valve element 17 is positioned in the common bore area 16. The actuator means 18 includes valve seating means generally designated as 19 providing for movement of the ball valve element 17 both axially along the main housing bore 11a and rotatingly into a seated position against one or the other of the annular seating surfaces 14 and 15.

Figure 2:
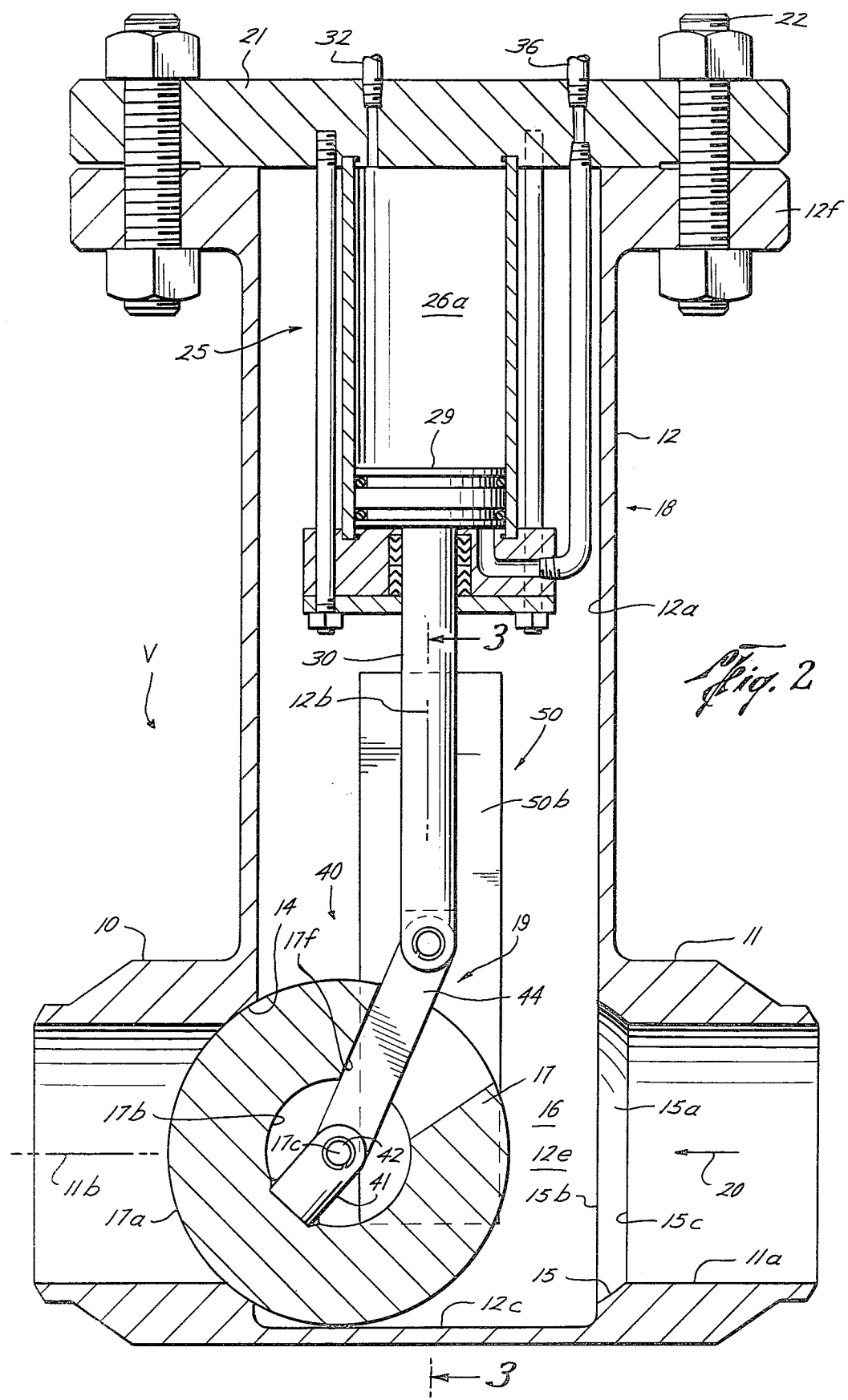
FIG. 2 is a sectional view similar to FIG. 1 with the pivotal ball check valve being in an actuated, seated position against one of the two annular seating surfaces of the main housing bore.

Referring to FIG. 2, the ball valve element 17 is shown positioned axially and rotatingly in sealing engagement with the annular seating surface 14. The ball valve element 17 is moved and held in the sealed position as shown in FIG. 2 by the force of fluid flowing in the direction of arrow 20. Due to the substantially spherical shape of the ball valve element 17 and the spaced position of the opposing annular sealing surfaces 14 and 15, and to the pressure responsive nature of the ball valve element 17, the ball valve element is positionable against either one of the seating surfaces 14 and 15, depending upon the direction of fluid flow within the main housing section bore 11a.

The main housing section 11 includes a thick wall portion 11c formed with a thinner wall portion 11d, which is adapted to be welded into a main fluid flowline such as a pipeline. The pivotal ball check valve V of this invention is adapted to be mounted in a flowline for transferring various fluid, gas or liquid. Referring to FIG. 1 and FIG. 3 in particular, the thicker portion 11c includes outer wall 11e, which is shown in a dotted or hidden line in FIG. 3.

The actuator housing section bore 12a is cylindrical and extends down into the main housing section bore 11a and terminates in a curved, bottom wall portion 12c. The area 16 common to the main housing section bore 11a and to the actuator housing section bore 12a thus includes circular side wall portions 12d, 12e (FIG. 4) which meet the circular bottom wall portion 12c.

The annular seating surfaces or valve seats 14 and 15 are positioned at the opening of the main housing section bore 11a into the common bore area 16. Each annular seating surface such as 15 includes an actual curved portion of a suitable sealing material or machined sealing surface 15a bounded by machined circular edges 15c and 15d adapted to receive a portion of the outer substantially spherical surface 17a of the ball valve element 17. The annular seating surfaces or seats 14 and 15 are positioned in a plane, which may be defined by one of the machined edges 15b, parallel to the central axis 12b of the actuator housing section bore 12a and perpendicular to the axis 11b of the main housing section bore 11a.

The actuator housing section 12 terminates in a flanged portion 12f adapted to receive a top cover plate 21, which is bolted by bolts such as 22 to the flange portion 12f.

The actuator means 18 includes a power means or hydraulic cylinder assembly generally designated by the number 25 mounted into the bottom surface of the cover plate 21. The hydraulic cylinder assembly 25 includes a cylindrical member 26 extending downwardly into connection with a cylinder mounting plate 27. The cylinder mounting plate 27 receives a plurality of circumferentially spaced bolts 28 which are threadedly mounted into the cover plate 21 and extend downwardly and through the mounting plate 27 and are held in place by suitable nuts. The cylinder 26 is hollow and forms a chamber 26a which mounts piston 29 for slidable sealable movement therein. The piston 29 is connected to an actuator shaft 30 which extends through the mounting plate 27, which mounts a sealing packing 27a about the actuator shaft 30 so that the actuator shaft is mounted for slidable, sealable movement through the mounting plate 27. Hydraulic fluid under pressure may be introduced into the top of the cylinder chamber 26a through opening 31 in cover plate 21, which opening is connected to a hydraulic line 32. A second L-shaped opening 33 is machined into the mounting plate 27. The L-shaped opening 33 is connected to a first hydraulic line portion 34 which extends into threaded connection with opening 35 in the cover plate 21. Another hydraulic line 36 is mounted into the top of the opening 35 and extends with line 32 to a source of hydraulic power such as a hydraulic pump (not shown). Introduction of hydraulic fluid under pressure into chamber 26a through line 32 moves the piston 29 and actuator shaft 30 downwardly and, conversely, introduction of hydraulic fluid under pressure through line 36, hydraulic line portion 34 and opening 33 into the chamber 26a moves the piston 29 and actuator shaft 30 upwardly.

The valve seating means 19 of actuator means 18 includes the structure of the ball valve element 17 and the connection of the ball valve element 17 to the actuator shaft 30 of the hydraulic cylinder assembly 25. The ball valve element 17 has already been defined as including spherical outside surface 17a. A first, transverse bore 17b is formed in the ball valve element 17 in a direction transverse to the main housing section bore 11a. Specifically, the transverse bore 17b includes a central axis 17c which is perpendicular both to axis 11b of main housing section bore 11a and to the central axis 12b of the actuator housing section bore 12a. The transverse bore 17b extends entirely through the ball valve element 17 and forms flat side portions 17d and 17e on each side of the otherwise spherical outside surface 17a.

A second, frusto-conical bore 17f is machined into the top of the ball valve element 17 (FIG. 1); the bore 17f has a central axis 17g which intersects the transverse bore axis 17c and is perpendicular thereto. In the position of the ball valve element 17 illustrated in FIG. 1, the axis of the second bore portion 17f is co-terminus with the axis 12b of the actuator housing bore 12a. The frusto-conical bore 17f is tapered inwardly from outside ball valve element surface 17a toward the first, transverse bore 17b.

The valve seating means 19 includes articulation means generally designated by the number 40 connected to the actuator shaft 30 and to the ball valve element 17 in the transverse bore 17b and extending through the frusto-conical or truncated conical bore portion 17f for mounting the ball valve element 17 for rotational movement with respect to the actuator shaft 30. The articulation means 40 includes a U-shaped yoke 41 which is welded into the ball valve element 17 at substantially the bottom of the transverse bore 17b. The yoke 41 includes shaft bore 41a adapted to receive pin or shaft 42 which is held in place by suitable fastening rings such as 41b. The yoke 41 further includes a slot 41c receiving link element 44 which is pivotally mounted onto the pin 42. The pin 42 provides a first pivotal connection means mounting the link element or arm 44 for pivotal connection with respect to the ball valve element 17.

The link element 44 is connected to the actuator shaft 30 by second pivotal connection means which includes connector pin 45 extending through a bottom slot 30a in the actuator shaft 30. The connector pin 45 is held in place by fastening rings 45a. The axis of the pivotal connecting pins 42 and 45 is perpendicular to the axes 11b and 12b of both housing section bores and in this manner, the ball valve element 17 is mounted for rotational movement about transverse bore axis 17c which is co-terminus with axis of pin 42.

Referring to FIGS. 1 and 2, the frusto-conical bore portion 17f cooperates with the link element 44 and its pivotal connection to yoke 41 and to actuator shaft 30 to provide a movement limiting means for limiting the rotational movement of the ball valve element 17 as it is moved to seated position against either of the annular seating surfaces 14 and 15. As the ball valve element 17 is moved toward a seated position against a sealing surface such as 14 as shown in FIG. 2, the ball valve element is rotated clockwise or counterclockwise to a seated position against sealing surface 14. But such rotation in either direction is limited by the engagement of the link element 44 against the wall of the frusto-conical bore portion 17f. Actually, FIG. 2 depicts clockwise rotation, but it should be understood that the structure of the bore 17f and the mechanical connection of the link arm 44 to yoke 41 will allow rotation of the valve element 17 in either direction to a seated position against the valve sealing surface 14.

Referring to all the figures, guide means generally designated by the number 50 are mounted in the actuator housing section bore 12a, including the common bore area 16, for engaging the ball valve element 17 and preventing rotation of the ball valve element 17 about an axis parallel to the actuator housing section bore axis 12b. The guide means 50 includes a guide plate 50a welded or otherwise attached to one of the main actuator bore curved side portions 12d for engaging flat valve element surface portion 17d. Another guide plate 50b is mounted on the opposite side of the actuator housing bore 12a against the opposing curved bore portion 12e for engaging valve element flat surface portion 12e. It is noted that the guide plates 50a and 50b engage flat valve surface portions 17d and 17e, respectively, fully when the valve element 17 is in its first, withdrawn position entirely within the actuator housing bore 12a. When the ball valve element 17 is moved downwardly into a sealing position against an annular sealing surface such as 14, it is noted that the guide plates 50a and 50b continue to engage a portion of the flat valve element surface portions 17d and 17e, respectively, thus continuing to hold the valve element 17 against rotational movement about the actuator housing bore axis 12b.

In operation and use, the ball valve element 17 is positioned in FIG. 1 in a first, withdrawn position entirely within the actuator housing section bore 12a. In this withdrawn position, hydraulic fluid under pressure is supplied through hydraulic line 36 and finally through mounting plate opening 33 into the bottom of the hydraulic cylinder chamber 26a thereby forcing the hydraulic piston 29 and actuator shaft 30 to their uppermost position. Whenever it is necessary to actuate the pivotal ball check valve V, hydraulic fluid under pressure is applied through hydraulic line 32 in order to displace downwardly hydraulic piston 29 and actuator shaft 30 thus moving vertically downwardly the ball valve element 17. As the ball valve element 17 is moved downwardly into the common area 16, the ball valve element 17 comes under the influence of the pressure and momentum of fluid flow through the main housing section bore 11a and is moved axially in the direction of the fluid flowing through the main housing section bore 11a toward one of the seating surfaces 14 or 15. With fluid flow in the direction of arrow 20, as shown in FIG. 1, the ball valve element 17 is moved toward the valve sealing surface or seat 14. The annular seating surfaces 14 and 15 are positioned sufficiently far apart so as to provide alternate sealing to the ball valve element 17.

The ball valve element 17 is continued to be lowered until it is positioned in its lowermost position and is not only axially moved towards the annular seating surface 14, but is also rotated about transverse bore axis 17c by the connection of articulation means 40 heretofore described.

Rotation of the ball valve element 17 simultaneously with movement toward annular seating surface 14 is a clockwise rotation as viewed in FIG. 2. This rotation allows the ball valve to properly seat against the annular seating surface 14, which is actually aligned with the side wall of the actuator housing bore 12a, as viewed in FIG. 1. It is necessary to have this additional, rotational movement in order for the ball valve element 17 to properly seat against either of the seating surfaces 14 and 15.

In order to properly position the ball valve element 17, the frusto-conical second bore portion 17f is of such diameter and angle that a side wall of the bore portion 17f meets the link element 44 as the ball valve element 17 is exactly positioned in a sealing manner against the annular sealing surface 14, further rotational movement being thereafter limited by the engagement of the wall of the second bore 17f against the link element 44. The guide plates 50a and 50b continuously engage the flat portions 17d and 17e, respectively, of the ball valve element 17 even as the ball valve element 17 is moved to a seated, sealed position.

The pivotal ball check valve V of this invention has many advantages. For example, the combination of both axial and rotational movement allows the ball valve element 17 to be exactly positioned against either of the annular sealing surfaces 14 and 15, which are positioned a distance apart approximately equal to the outer diameter of the ball valve element 17. Furthermore, the utilization of the hydraulic actuator assembly 25 allows for the ball valve element 17 to be moved to a down, sealing position in response to positive fluid pressure through hydraulic line 32 or to an absence of pressure in hydraulic line 36, which may occur in an emergency condition, and thus in the portion of the hydraulic chamber 26a below the hydraulic piston 29. Thus, it is possible that the ball valve element 17 will be moved to a seated position under a loss of pressure in hydraulic line 36, thus making the pivotal ball check valve V adaptable for use as a safety valve.

The foregoing disclosure and description of the invention are illustrative and explanatory thereof, and various changes in the size, shape and materials as well as in the details of the illustrated construction may be made without departing from the spirit of the invention.

We claim:
1. A pivotal ball valve, comprising:
  a valve housing including a main housing section including a bore forming a fluid passageway for the flow of fluid along the axis of said main housing section bore;
  an actuator housing section connected with said main housing section, said actuator housing section including an actuator bore which opens to said main housing section bore;
  said main housing section bore including first and second annular seating surfaces being formed across the axis of said main housing section bore;
  a ball valve element;
  an actuator shaft positioned in said actuator housing;
  power means mounted at least partly in said actuator housing for moving said actuator shaft axially within said actuator housing section bore;
  said ball valve element having a first bore extending through said ball valve element, said first ball valve element bore having an axis transverse to said main housing section bore axis;
  said ball valve element having a second bore with an axis perpendicular to said first ball valve element bore axis, said second valve bore opening into said first valve bore;
  a yoke connection to said ball valve element in said first ball valve element bore;

a link element extending through said second ball valve element bore into said first ball valve element bore; and first pivotal connection means pivotally connecting said yoke and link element together and second pivotal connection means pivotally connecting said link element to said actuator shaft whereby said ball valve element is mounted for rotation with respect to said first ball valve element bore axis whereby said ball valve element is moved axially along said main housing section bore and rotatingly into a seated position against one of said annular seating surfaces.

2. The structure set forth in claim 1, wherein said valve seating means further includes:

means for limiting said rotational movement of said ball valve element to the position of sealing engagement of said ball valve element against one of said first and second annular seating surfaces.

3. The structure set forth in claim 1, including:

said first and second pivotal connection means are connector pins, each pin having an axis perpendicular to said main housing section bore axis.

4. The structure set forth in claim 1, including:

said second ball valve element bore being frusto-conical in configuration.

5. A pivotal ball valve, comprising:

a valve housing including a main housing section including a bore forming a fluid passageway for the flow of fluid along the axis of said main housing section bore;

an actuator housing section connected with said main housing section, said actuator housing section including an actuator bore which opens to said main housing section bore;

said main housing section bore including first and second annular seating surfaces being formed across the axis of said main housing section bore;

a ball valve element;

actuator means mounted with said actuator housing section and connected to said ball valve element for moving said ball valve element between a first position wherein said ball valve element is positioned in said actuator housing section bore and a second position in which said ball valve element is positioned in said main housing section bore;

said actuator means includes valve seating means for allowing said ball valve element to move axially along said main housing section bore and rotatingly into a seated position against one of said first and second annular seating surfaces;

said ball valve element having a first bore therethrough, said first bore having an axis transverse to said main housing section bore axis;

said ball valve element terminating in flat portions formed at each end of said first bore; and guide plates mounted in said actuator housing section bore in engagement with said flat portions of said ball valve element for preventing rotation of said ball valve element about an axis parallel to said actuator housing section bore axis.

6. The structure set forth in claim 1, wherein:

said actuator housing section bore axis is perpendicular to said main housing section bore axis.

7. The structure set forth in claim 1, wherein:

each of said annular seating surfaces is located on a plane perpendicular to said main housing section bore axis.

8. The structure set forth in claim 2, including:

means to allow said actuator shaft and said valve element to move toward said second position in response to an emergency condition.

9. The structure set forth in claim 4, wherein:

said second ball valve element bore engaging said link element with said ball valve element in a seated position to prevent further rotation of said ball valve element with respect to said link element.

* * * * *